US00RE41106E

(19) United States
(12) Reissued Patent
Kalliojarvi et al.

(10) Patent Number: US RE41,106 E
(45) Date of Reissued Patent: Feb. 9, 2010

(54) PLACEMENT OF IDLE PERIODS

(76) Inventors: Kari Kalliojarvi, Keilalahdentie 4, Espoo (FI), 02150; Isabella Modonesi, 4 Via Vignola 8, Monte Porzio Catone (RM) (IT), 00040

(21) Appl. No.: 12/203,292

(22) PCT Filed: Jul. 7, 2000

(86) PCT No.: PCT/IB00/01719

§ 371 (c)(1),
(2), (4) Date: May 14, 2002

(87) PCT Pub. No.: WO01/05163

PCT Pub. Date: Jan. 18, 2001

Related U.S. Patent Documents

Reissue of:
(64) Patent No.: 7,158,503
Issued: Jan. 2, 2007
Appl. No.: 10/030,352
Filed: May 14, 2002

(30) Foreign Application Priority Data

Jul. 9, 1999 (GB) ..... 9916220

(51) Int. Cl.
*H04B 7/212* (2006.01)

(52) U.S. Cl. ..... 370/347; 370/478; 370/442; 455/456.1

(58) Field of Classification Search ..... None
See application file for complete search history.

(56) References Cited

U.S. PATENT DOCUMENTS 5,233,643 A 8/1993 Naeini et al.
5,613,198 A 3/1997 Ahmadi et al.
6,041,047 A 3/2000 Diachina et al.
6,397,071 B1 5/2002 Hussain et al.
6,405,039 B1 6/2002 Koorapaty et al.
6,470,024 B1 10/2002 Hamalainen et al.
2002/0034952 A1 * 3/2002 Hussain et al. ..... 455/456

FOREIGN PATENT DOCUMENTS

EP 0324508 3/1995
WO WO 97/08911 3/1997

OTHER PUBLICATIONS

Copy of the International Search Report for PCT/IB2000/01719 mailed on Mar. 13, 20001.

Copy of the International Preliminary Examination Report for PCT/IB2000/01719 completed on Aug. 30, 2001.

* cited by examiner

*Primary Examiner*—Bob A Phunkulh

(57) ABSTRACT

A telecommunications system comprising: a plurality of transmitters capable of transmitting data in superframes, each superframe comprising a plurality of frames, and each frame comprising a plurality of slots; the transmitters being arranged in groups, each group comprising a number of base stations, each group of base stations being assigned one or more slot numbers which are different from those of other groups and each of the transmitters of each group being assigned a different frame number, each transmitter being arranged to operate at reduced transmission power for a period commencing in the allocated slot or slots assigned to its group in the frame assigned to it.

91 Claims, 2 Drawing Sheets

PLACEMENT OF IDLE PERIODS

Matter enclosed in heavy brackets [ ] appears in the original patent but forms no part of this reissue specification; matter printed in italics indicates the additions made by reissue.

[PRIORITY CLAIM

This is a national stage of PCT application No. PCT/IB00/01719, filed on Jul. 7, 2000. Priority is claimed on patent application No. 9916220.8 filed in The United Kingdom on Jul. 9, 1999.]

*CROSS-REFERENCE TO RELATED APPLICATIONS*

*This application is a Reissue application of U.S. Ser. No. 10/030,352, filed Jul. 7, 2000, now U.S. Pat. No. 7,158,503, granted Jan. 2, 2007, which is a national stage of PCT application No. PCT/IB00/01719, and claims priority on application No. 9916220.8 filed in the United Kingdom on Jul. 9, 1999.*

FIELD OF THE INVENTION

The present invention relates to a telecommunications system and in particular to the arrangement of transmitters to potentially allow the transmissions of individual transmitters to be more easily distinguished.

BACKGROUND OF THE INVENTION

It is known to be desirable in telecommunications systems to provide positioning methods for determining the geographical location of users within the system. This is useful for many reasons, such as emergency location, area-based billing, fleet management for trucking companies and other similar location based value-added services.

One way of mobile phone positioning is by means of a triangulation system, in which the location of a particular mobile phone is calculated using control signals from at least the three basic stations closed to it. This system uses the assumption that the distance of the phone from a base station is proportional to the strength of the signal which the base station receives from it, or the time taken for the signal to travel between the phone and the respective base station. Thus the position of the phone can be determined by comparing the relative strengths or travel time of received signals between the three base stations and thus assessing the distance of the user from each base station. The actual location of the user is then obtainable geometrically since the location of the base stations is known and fixed.

There are a number of different methods of making the measurements for performing the above calculation, depending on the mobile system. In a Code Division Multiple Access (CDMA) system, the method which provides the greatest accuracy as well as having other advantages is a time-based method. This method is a downlink method in which a user's mobile phone measures the differences in the time of arrival (TOA) of signals from surrounding base stations in order to determine the relative distances between the user and each base station.

One particular problem which a time-based method is capable of overcoming is that of "hearability". This problem occurs when the user's mobile phone is much closer to one of the base stations being used for positioning purposes than other surrounding base stations. In this situation, the signal between the user and the close station is so strong, that it is difficult to transmit and receive signals between the user and the other surrounding base stations. This problem occurs particularly in a CDMA system, because all base stations typically transmit at the same carrier frequency.

In the proposed wideband CDMA system (W-CDMA), which is suggested for the universal mobile telecommunications system (UMTS) standard there are proposed to be three types of control channel. This first type is broadcast control channels (BCH) which are to be used, for example, for transmitting frequency and frame synchronisation information. The second type is common control channels (CCCH) which are to be used for network access, for example paging services. These first two types are common to all mobile users. The third type is dedicated control channels which are to be allocated to individual users. These include channels used for handover and user registration. It is likely that measurements for the purpose of mobile phone location will use an existing BCH. Signals are transmitted in blocks called frames, transmitted over each channel. The order of transmission of frames from the different data streams is suitably selected for greatest efficiency. Since this is not a time division system, the problem of hearability can in principle be overcome by transmitting at reduced power or ceasing transmission from the closest base station for short periods of time. Such a time period is known as an idle period. It allows the remaining base station being used for positioning purposes to communicate with the mobile phone, thus providing the ability to locate the user. This should not affect the transmission quality significantly since during such a time period, a user's mobile phone will often receive signals from its other nearby base stations if the mobile phone is in a soft handover (macrodiversity) situation.

In order to allow positioning to occur during idle periods it would be desirable to allocate idle periods such that nearby base stations do not have idle periods at the same time. This is so during an idle period, a mobile phone will still be able to pick up signals from other nearby base stations and therefore the positioning of the mobile can continue using signals from other base stations.

SUMMARY OF THE INVENTION

According to the present invention there is provided a telecommunications system comprising: a plurality of transmitters capable of transmitting data in superframes, each superframe comprising a plurality of frames, and each frame comprising a plurality of slots; the transmitters being arranged in groups, each group comprising a number of base stations, each group of base stations being assigned one or more slot numbers which are different from those of other groups and each of the transmitters of each group being assigned a different frame number, each transmitter being arranged to operate at reduced transmission power for a period commencing in the allocated slot or slots assigned to its group in the frame assigned to it.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

An embodiment of the present invention will now be described by way of example with reference to the accompanying drawings in which.

DETAILED DESCRIPTION OF THE PRESENTLY PREFERRED EMBODIMENT

This embodiment relates to a mobile telecommunications system using the proposed W-CDMA standards, in which the network is asynchronous. The following description focuses on control of base stations by radio network controllers (RNCs) and transmission between the base stations and mobile telephones.

In the proposed W-CDMA system, a mobile station can communicate by radio with one or more base stations. Each base station is controlled by an RC, each of which can control a number of base stations. The RNCs are connected to one or more core network entities which are connected to other telecommunications networks, and by means of which telecommunications services can be provided to the mobile station.

Figure 1:
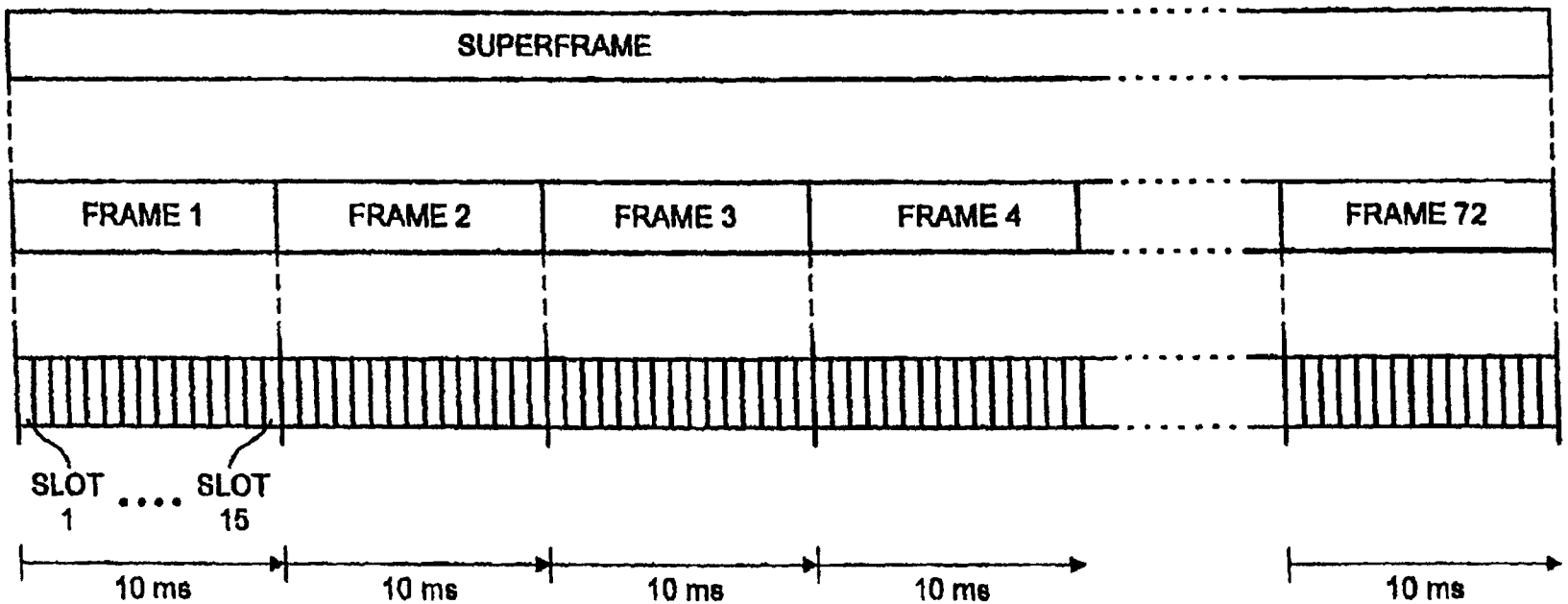
FIG. 1 is a schematic representation of a superframe divided into frames, and the associated time slots.

Under normal conditions a base station (BS) transmits signals carrying a variety of data and control information in the form of frames. In this embodiment, there are 72 frames in one superframe and each frame is 10 ms long. Thus each superframe is 0.72 seconds long. This is indicated in FIG. 1. FIG. 1 shows a superframe (labelled SUPERFRAME) divided into 72 frames, labelled FRAME 1, FRAME 2, FRAME 3 . . . FRAME 72. The number and duration of frames in this embodiment are an example, but there could be a different number of frames in a superframe and the frames could be of a duration different from 10 ms. Signals transmitted by a base station may be used for determining the locations of mobile phones.

FIG. 1 also shows that in terms of time, each frame is divided into 15 slots, each slot having a length in time of one fifteenth of 10 ms, which is approximately 0.667 ms. These slots are labelled for illustration for FRAME 1 as SLOT 1 . . . SLOT 15. Each slot represents one measurement period for positioning purposes, that is to say signal measurements for positioning purposes can be made by the base station approximately every 0.667 ms.

In this embodiment, idle periods are scheduled to occur for the duration of one (approximately) 0.667 ms slot. Thus when an idle period is scheduled for a particular base station that base station will be either cease transmission or transmit at much reduced power for a (approximately) 0.6667 ms slot. During this period any mobile phones located near to such a particular base station will continue to receive signals from other base stations near to them, so that positioning of such mobile phones can continue using these other signals. Indeed the reduced signal from the particular base station allows these other signals to be received with much greater accuracy by the mobile phones.

In order for it to be assured that mobile phones can continue to receive signals from other base stations during the idle period of one base station, it is necessary to co-ordinate the occurrence of idle periods of nearby base stations in the mobile network. The assignment of idle periods to base stations is carried out by a radio network controller (RNC) according to a predetermined strategy.

Figure 2:
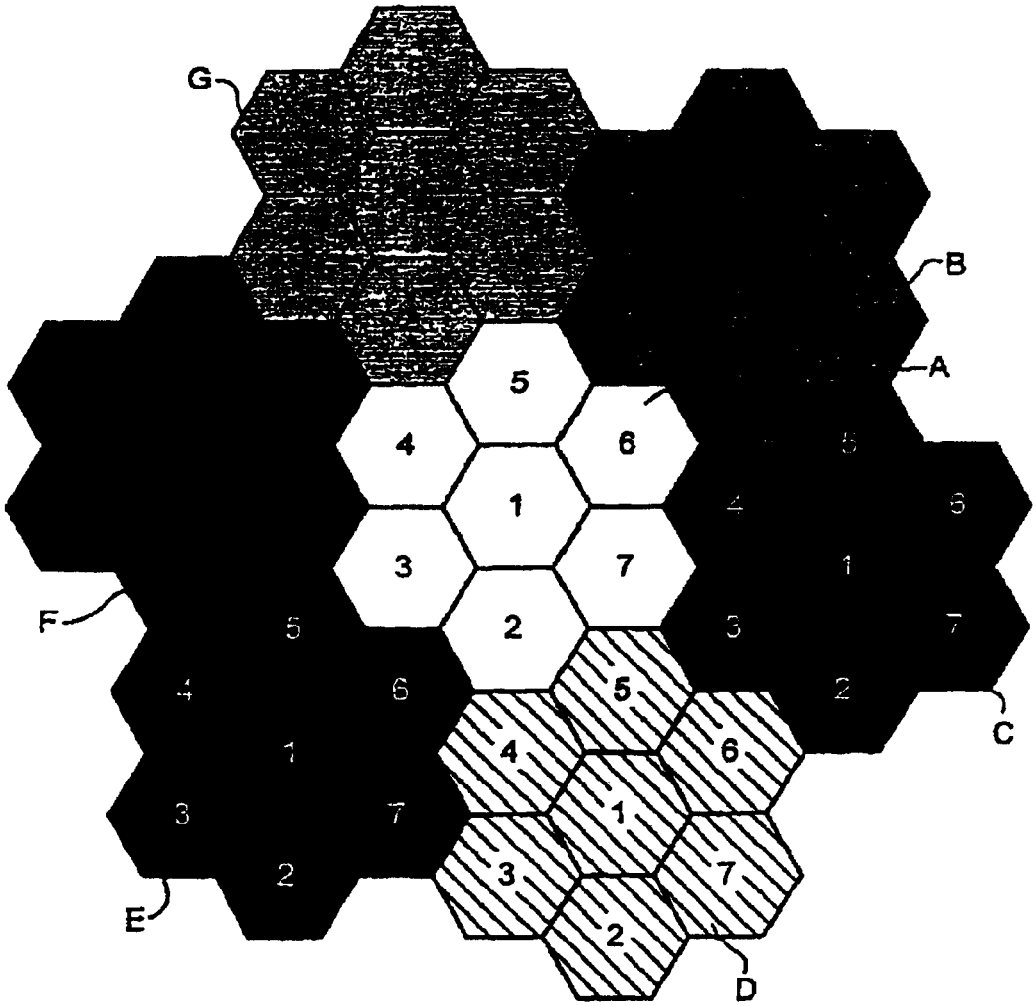
FIG. 2 is a representation of a two-layer re-use system in one RNC coverage area.

FIG. 2 shows how the idle periods are assigned in the present embodiment. This figure shows a part of one RNC coverage area, in which all the base stations are controlled by one RNC. The RNC coverage area can be considered to continue in all directions beyond the part shown and furthermore the telecommunications system can be considered to extend beyond that in other RNC coverage areas, but for the purposes of describing this embodiment, the description of the allocation of idle periods is based on consideration of the seven groups of base stations shown in FIG. 2. The number-seven here is used as an example in this embodiment, but a different number could be chosen. The areas covered by the radio cells of the base stations of each of the seven groups are shown by different shadings and are labelled A–G. In the arrangement shown in the figure, group A is the central group which is surrounded by the other six groups B–G. Group B is situated to the top right of group A and groups C–G are situated in clockwise progression from group B. There are no gaps between the groups. In practice the groups may overlap, or there may be some gap in coverage areas between the groups.

Each of the seven groups A–G contains seven base stations, labelled 1–7. For ease of drawing, each base station is shown as covering a hexagonal area so that there are no uncovered areas. Referring to FIG. 2, within the hexagonal area of a particular base station, it is assumed that a mobile phone will receive the strongest signal from that base station. In practice the areas would be less uniform, but this would not affect the working of the embodiment significantly. In practice the area covered by a base station depends on factors including intervening features, such as buildings, and the directionality of the base station's antenna. In practice the coverage areas of adjacent base stations may abut, overlap or be spaced somewhat apart.

It should be understood that any sub-base stations or sectors within the hexagonal area of a base station, for example sub-base stations within an office site, can be synchronised with the base station and allocated idle periods at the same time. This is because positioning of a mobile may be assumed to involve measurements between different base station sites, not between sub-base stations within a site.

In the system of FIG. 2 a two-level reuse pattern is used to allocate idle periods. In order to illustrate this concept, the first level reuse pattern will be described with reference to group A.

Group A contains seven base stations, which are a central one, BS1, surrounded by six others, arranged such that BS2 is directly below BS1 and BS3–7 are situated in clockwise progression from BS2. Thus the shape of the area covered by each group is defined by a central hexagonal surrounded by six further hexagons joined along adjacent edges. There are no gaps between the areas. It would be possible to number the base stations differently or to use a different number of base stations within a group or to use a different shape to depict the coverage area of a base station. The numbering and arrangement of cells is purely illustrative.

The purpose of the first level of reuse is to ensure that no two of BS1–7 are allocated an idle period at the same time. Therefore the idle periods are allocated in sequence (although other allocation schemes could be used to achieve the same result). This is shown in Table 1 below, for one superframe.

TABLE 1

First level reuse frame allocation for Group A

| BS number | Assigned frames for idle period |
|---|---|
| BS1 | 1 8 15 22 29 36 43 50 57 64 |
| BS2 | 2 9 16 23 30 37 44 51 58 65 |

TABLE 1-continued

First level reuse frame allocation for Group A

| BS number | Assigned frames for idle period |
|---|---|
| BS3 | 3 10 17 24 31 38 45 52 59 66 |
| BS4 | 4 11 18 25 32 39 46 53 60 67 |
| BS5 | 5 12 19 26 33 40 47 54 61 68 |
| BS6 | 6 13 20 27 34 41 48 55 52 69 |
| BS7 | 7 14 21 28 35 42 49 56 63 70 |

Since there are seven base stations, the reuse factor in this case is chosen to be 7. This means that the first seven frames of the superframe are assigned sequentially to BS1–7 and then the next seven are similarly assigned (frames 8–14) followed by the next seven (frames 15–21) and so on, until 70 frames have been allocated. Since the superframe consists of 72 frames, frames 71 and 72 are not allocated. Alternatively, frames 71 and 72 could be allocated to any base station. Upon completion of this superframe, the pattern is repeated for the subsequent superframes.

Such an assignment of idle periods means that one idle period is equal to the measurement interval. This is because in this embodiment an idle period occurs throughout one (approximately) 0.667 ms time slot, as explained above. The measurement interval is decided according to the required quality of data transmission. The period of (approximately) 0.667 ms is in the proposed W-CDMA standard but other periods are compatible with the present invention. In the W-CDMA standard the performance penalty due to the occurrence of an idle period over this time period is likely to be acceptably small.

Table b 1depicts a uniform assignment of frames having idle periods. An alternative would be to vary the allocation of idle periods so that some base stations were allocated more idle periods than others. This might be useful depending on the number of mobile phones in the area of some base stations at a particular time.

It would also be possible to vary the pattern of allocation between superframes, but this might well add unnecessary complications.

Having considered the first level reuse pattern for group A, referring to FIG. 2 it can be seen that the other groups B–G are formed from similar arrangements of hexagons defining similar base station coverage areas. Each group is arranged to have a central base station BS1 surrounded by the other six base stations BS2–7, BS2 being directly below BS1 and BS3–7 being situated in clockwise progression from BS2. This means that there is no occurrence of a same-numbered base station from one group being situated adjacent to a same-numbered base station of another group. This means that in this embodiment, each of the groups uses the same first-level reuse pattern as that described above for group A. Therefore it can be arranged that adjacent base stations of different groups will always be assigned different frame numbers for idle periods. This is some uncertainty that this will be the case due to the asynchronicity of the network.

It would be possible to vary the pattern of frame allocation between groups, for example to be non-uniform.

To summarise, the first reuse level defines the frame numbers of the frames containing the idle periods within a superframe for each base station.

The second level reuse pattern will now be described with reference to the entire area depicted in FIG. 2. The purpose of the second level reuse allocation is to define the location of the start of the idle period within a frame, the frame having been allocated according to the first reuse level. In this embodiment, one slot is allocated for an idle period, but it would be possible to allocate one or more adjacent time slots within a frame during which the base station will have an idle period. Since there are 15 slots within a frame in this embodiment, the maximum second level re-use factor is 15. In general, the maximum reuse factor is given by the following expression:

Integer part of [number of slots in a frame/length of idle period in slots]

The second level reuse pattern is allocated according to groups. This means that all seven base stations in any one group are allocated the same slot number within any given frame. In fact, just odd slot numbers are allocated, as shown in table 2 below.

TABLE 2

Second level reuse slot allocation in one frame

| Group | Slot number |
|---|---|
| A | 1st slot |
| B | 11th slot |
| C | 13th slot |
| D | 3rd slot |
| E | 5th slot |
| F | 7th slot |
| G | 9th slot |

The table indicates that central group A is allocated the first slot of every frame and odd-numbered slots 3–13 are allocated to the remaining groups in a clockwise sequence from group D round to group B.

Such a slot allocation means that for any given group, all seven base stations within that group use the same slot number within their allocated frame. By virtue of the first level frame reuse allocation, namely that different base stations within a group are allocated different frames, the risk of allocated idle periods of adjacent base stations within a group occurring at the same time is small. The risk is not zero, due to the asynchronicity between base stations. Furthermore, since adjacent base stations of different groups are allocated both different frame numbers and slot numbers, the risk of their idle periods occurring at the same time is similarly small.

In practical terms, since the separation in time between consecutive idle periods is a constant, measurement delays which happen as a result of an idle period do not depend on the time at which a mobile positioning update is requested. Hence the effect on service quality is likely to be small.

Thus, in summary, the base stations are split into groups of adjacent or at least nearby base stations which may or may not be controlled by a single RNC. The base stations in each group are each allocated selected frames of the recurring superframes of the transmission structure such that in each group no more than one base station is allocated any frame. Between adjacent or at least nearby groups an allocation of idle periods as selected slots in the recurring frames of the transmission structure is made such that no more than one group in a locality is allocated any slot. By this means the likelihood of any more than one base station in a locality having an idle period at any time is greatly reduced. Hence, the opportunity for a mobile station to reliably measure the signals transmitted from the base stations can be increased and the accuracy of positioning measurements can potentially be improved.

It will be appreciated that the embodiment would be implemented in a similar way in the surrounding RNC coverage areas, such that the risk of idle periods of base stations adjacent to one another but falling within a different RNC coverage area occurring at the same time, is also similarly well.

According to this embodiment, in any one frame each base station is allocated just one idle slot out of the 15 available, meaning that each idle period lasts for a duration of one slot, or approximately 0.667 ms. It would be possible to vary the idle period duration by allocating other multiples of slots to a base station, for example half a slot, two or more slots or even a whole frame. It would also be possible, for example, to allocate more than two slots to some base stations and none to others depending on requirements, thus varying the duration of each base station's idle period. It would also be possible to not allocate any slots for some frames and hence reduce the total number of idle periods within a superframe and thus increase the service quality.

The embodiment described is concerned within minimising the chance of idle periods of adjacent base stations from coinciding. Since the allocation of frames and slot numbers is flexible, it would be possible to number the base stations differently or locate the groups differently should it be desired to use different criteria for optimum idle period allocation. The described idle period allocation would also work across RNC coverage areas.

The described embodiment is for an asynchronous network. It allows the probability of idle periods of nearby base stations overlapping to be small. The embodiment and its mentioned alternatives would work equally well with a synchronous network and in that case would in fact guarantee no overlap.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function is substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A telecommunications system comprising:

a plurality of transmitters capable of transmitting data in superframes, each superframe comprising a plurality of frames, and each frame comprising a plurality of slots;

the transmitters being arranged in groups, each group comprising a number of base stations, each group of base stations being assigned one or more slot numbers which are different from those of other groups and each of the transmitters of each group being assigned a different frame number, each transmitter being arranged to operate at reduced transmission power for a period commencing in the allocated slot or slots assigned to its group in the frame assigned to it.

2. A telecommunications system according to claim 1, wherein each group comprises a set of nearby transmitters.

3. A telecommunications system according to claim 1, wherein adjacent base stations within a group are assigned different frame numbers.

4. A telecommunications system according to claim 1, wherein adjacent base stations belonging to different groups are assigned different frame numbers.

5. A telecommunications system according to claim 1, wherein all the base stations within one group are assigned the same slot number or numbers.

6. A telecommunications system according to claim 1, wherein each frame comprises 15 slots and geographically adjacent groups are assigned slots which are spaced apart by at least one slot period.

7. A telecommunications system according to claim 1, each of the transmitters of each group being assigned more than one frame number.

8. A telecommunications system according to claim 1, in which each superframe comprises 72 frames.

9. A telecommunications system according to claim 1, wherein the transmitters operate asynchronously.

10. A telecommunications system according to claim 1, wherein in order to operate at reduced transmission power during the slot or slots assigned to its group in the frame assigned to it, each transmitter is arranged to undergo an idle period.

11. A telecommunications system according to claim 1, wherein each transmitter is arranged to operate at reduced transmission power for 0.667 ms during the slot or slots assigned to its group in the frame assigned to it.

12. A telecommunications system according to claim 1, which is operable according to a W-CDMA system.

13. A telecommunications system according to claim 1, wherein the said period is longer than one slot.

14. A telecommunications system according to claim 2, wherein adjacent base stations within a group are assigned different frame numbers.

15. A telecommunications system according to claim 2, wherein adjacent base stations belonging to different groups are assigned different frame members.

16. A telecommunications system according to claim 3, wherein adjacent base stations belonging to different groups are assigned different frame numbers.

17. A telecommunications system according to claim 2, wherein all the base stations within one group are assigned the same slot number or numbers.

18. A telecommunications system according to claim 3, wherein all the base stations within one group are assigned the same slot number of numbers.

19. A telecommunications system according to claim 4, wherein all the base stations within one group are assigned the same slot number of numbers.

20. A telecommunications system according to claim 2, wherein each frame comprises 15 slots and geographically adjacent groups are assigned slots which are spaced apart by at least one slot period.

21. A telecommunications system according to claim 3, wherein each frame comprises 15 slots and geographically adjacent groups are assigned slots which are spaced apart by at least one slot period.

22. A telecommunications system according to claim 4, wherein each frame comprises 15 slots and geographically adjacent groups are assigned slots which are spaced apart by at least one slot period.

23. A telecommunications system according to claim 5, wherein each frame comprises 15 slots and geographically adjacent groups are assigned slots which are spaced apart by at least one slot period.

24. A telecommunications system according to claim 2, each of the transmitters of each group being assigned more than one frame number.

25. A telecommunications system according to claim 3, each of the transmitters of each group being assigned more than one frame number.

26. A telecommunications system according to claim 4, each of the transmitters of each group being assigned more than one frame number.

27. A telecommunications system according to claim 5, each of the transmitters of each group being assigned more than one frame number.

28. A telecommunications system according to claim 6, each of the transmitters of each group being assigned more than one frame member.

29. A telecommunications system according to claim 2, in which each superframe comprises 72 frames.

30. A telecommunications system according to claim 3, in which each superframe comprises 72 frames.

31. A telecommunications system according to claim 4, in which each superframe comprises 72 frames.

32. A telecommunications system according to claim 5, in which each superframe comprises 72 frames.

33. A telecommunications system according to claim 6, in which each superframe comprises 72 frames.

34. A telecommunications system according to claim 7, in which each superframe comprises 72 frames.

35. A telecommunications system according to claim 2, wherein the transmitters operate asynchronously.

36. A telecommunications system according to claim 3, wherein the transmitters operate asynchronously.

37. A telecommunications system according to claim 4, wherein the transmitters operate asynchronously.

38. A telecommunications system according to claim 5, wherein the transmitters operate asynchronously.

39. A telecommunications system according to claim 6, wherein the transmitters operate asynchronously.

40. A telecommunications system according to claim 7, wherein the transmitters operate asynchronously.

41. A telecommunications system according to claim 8, wherein the transmitters operate asynchronously.

42. A telecommunications system according to claim 2, wherein in order to operate at reduced transmission power during the slot or slots assigned to its group in the frame assigned to it, each transmitter is arranged to undergo an idle period.

43. A telecommunications system according to claim 3, wherein in order to operate at reduced transmission power during the slot or slots assigned to its group in the frame assigned to it, each transmitter is arranged to undergo an idle period.

44. A telecommunications system according to claim 4, wherein in order to operate at reduced transmission power during the slot or slots assigned to its group in the frame assigned to it, each transmitter is arranged to undergo an idle period.

45. A telecommunications system according to claim 5, wherein in order to operate at reduced transmission power during the slot or slots assigned to its group in the frame assigned to it, each transmitter is arranged to undergo an idle period.

46. A telecommunications system according to claim 6, wherein in order to operate at reduced transmission power during the slot or slots assigned to its group in the frame assigned to it, each transmitter is arranged to undergo an idle period.

47. A telecommunications system according to claim 7, wherein in order to operate at reduced transmission power during the slot or slots assigned to its group in the frame assigned to it, each transmitter is arranged to undergo an idle period.

48. A telecommunications system according to claim 8, wherein in order to operate at reduced transmission power during the slot or slots assigned to its group in the frame assigned to it, each transmitter is arranged to undergo an idle period.

49. A telecommunications system according to claim 9, wherein in order to operate at reduced transmission power during the slot or slots assigned to its group in the frame assigned to it, each transmitter is arranged to undergo an idle period.

50. A telecommunications system according to claim 2, wherein each transmitter is arranged to operate at reduced transmission power for 0.667 ms during the slot or slots assigned to its group in the frame assigned to it.

51. A telecommunications system according to claim 3, wherein each transmitter is arranged to operate at reduced transmission power for 0.667 ms during the slot or slots assigned to its group in the frame assigned to it.

52. A telecommunications system according to claim 4, wherein each transmitter is arranged to operate at reduced transmission power for 0.667 ms during the slot or slots assigned to its group in the frame assigned to it.

53. A telecommunications system according to claim 5, wherein each transmitter is arranged to operate at reduced transmission power for 0.667 ms during the slot or slots assigned to its group in the frame assigned to it.

54. A telecommunications system according to claim 6, wherein each transmitter is arranged to operate at reduced transmission power for 0.667 ms during the slot or slots assigned to its group in the frame assigned to it.

55. A telecommunications system according to claim 7, wherein each transmitter is arranged to operate at reduced transmission power for 0.667 ms during the slot or slots assigned to its group in the frame assigned to it.

56. A telecommunications system according to claim 8, wherein each transmitter is arranged to operate at reduced transmission power for 0.667 ms during the slot or slots assigned to its group in the frame assigned to it.

57. A telecommunications system according to claim 9, wherein each transmitter is arranged to operate at reduced transmission power for 0.667 ms during the slot or slots assigned to its group in the frame assigned to it.

58. A telecommunications system according to claim 10, wherein each transmitter is arranged to operate at reduced transmission power for 0.667 ms during the slot or slots assigned to its group in the frame assigned to it.

59. A telecommunications system according to claim 2, which is operable according to a W-CDMA system.

60. A telecommunications system according to claim 3, which is operable according to a W-CDMA system.

61. A telecommunications system according to claim 4, which is operable according to a W-CDMA system.

62. A telecommunications system according to claim 5, which is operable according to a W-CDMA system.

63. A telecommunications system according to claim 6, which is operable according to a W-CDMA system.

64. A telecommunications system according to claim 7, which is operable according to a W-CDMA system.

65. A telecommunications system according to claim 8, which is operable according to a W-CDMA system.

66. A telecommunications system according to claim 9, which is operable according to a W-CDMA system.

67. A telecommunications system according to claim 10, which is operable according to a W-CDMA system.

68. A telecommunications system according to claim 11, which is operable according to a W-CDMA system.

69. A telecommunications system according to claim 2, wherein the said period is longer than one slot.

70. A telecommunications system according to claim 3, wherein the said period is longer than one slot.

71. A telecommunications system according to claim 4, wherein the said period is longer than one slot.

72. A telecommunications system according to claim 5, wherein the said period is longer than one slot.

73. A telecommunications system according to claim 6, wherein the said period is longer than one slot.

74. A telecommunications system according to claim 7, wherein the said period is longer than one slot.

75. A telecommunications system according to claim 8, wherein the said period is longer than one slot.

76. A telecommunications system according to claim 9, wherein the said period is longer than one slot.

77. A telecommunications system according to claim 10, wherein the said period is longer than one slot.

78. A telecommunications system according to claim 11, wherein the said period is longer than one slot.

79. A telecommunications system according to claim 12, wherein the said period is longer than one slot.

*80. A method of coordinating transmission in a telecommunications system, the method comprising:*

*identifying a plurality of groups of base stations wherein each group of the plurality of groups includes a plurality of transmitters, the plurality of transmitters capable of transmitting data in superframes, each superframe comprising a plurality of frames, and each frame comprising a plurality of slots;*

*allocating each group of the plurality of groups one or more slot numbers which are different from the one or more slot numbers allocated to the other groups of the plurality of groups; and*

*allocating each transmitter of the plurality of transmitters of a group of the plurality of groups a different frame number, wherein each transmitter is configured to operate at a reduced transmission power for a period commencing in the allocated slot assigned to the group in the frame allocated to the transmitter.*

*81. The method of claim 80, wherein the reduced transmission power is no power.*

*82. The method of claim 80, further comprising allocating more than two slot numbers to some base stations and none to other base stations depending on requirements.*

*83. The method of claim 80, wherein geographically adjacent groups of base stations are assigned slot numbers which are spaced apart by at least one slot period.*

*84. The method of claim 83, wherein each frame comprises 15 slots.*

*85. The method of claim 80, wherein all base stations within one group are assigned the same slot numbers.*

*86. A radio network controller that assigns periods of reduced power transmission to base stations, the controller comprising:*

*a communication interface configured to send communications to a number of base stations in a coverage area; and*

*a processor configured to:*

*identify a plurality of groups of base stations wherein each group of the plurality of groups includes a plurality of transmitters, the plurality of transmitters capable of transmitting data in superframes, each superframe comprising a plurality of frames, and each frame comprising a plurality of slots;*

*allocate each group of the plurality of groups one or more slot numbers which are different from the one or more slot numbers allocated to the other groups of the plurality of groups; and*

*allocate each transmitter of the plurality of transmitters of a group of the plurality of groups a different frame number, wherein each transmitter is configured to operate at a reduced transmission power for a period commencing in the allocated slot assigned to the group in the frame allocated to the transmitter.*

*87. The controller of claim 86, wherein geographically adjacent groups are assigned slot numbers which are spaced apart by at least one slot period.*

*88. The controller of claim 86, wherein the processor is further configured to vary a duration of reduced transmission power by allocating other multiples of slots to a base station.*

*89. The controller of claim 86, wherein the processor is further configured to allocate more than two slot numbers to some base stations and none to other base stations depending on requirements.*

*90. The controller of claim 86, wherein all base stations within one group are assigned the same slot numbers.*

*91. The controller of claim 90, wherein each superframe comprises 72 frames.*

* * * * *